US011306606B2

(12) United States Patent
Sakamoto et al.

(10) Patent No.: US 11,306,606 B2
(45) Date of Patent: Apr. 19, 2022

(54) ROTARY MACHINE

(71) Applicant: Mitsubishi Hitachi Power Systems, Ltd., Yokohama (JP)

(72) Inventors: Hiroyuki Sakamoto, Tokyo (JP); Makoto Kondo, Tokyo (JP); Katsuhisa Hamada, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 98 days.

(21) Appl. No.: 16/489,114

(22) PCT Filed: Mar. 29, 2018

(86) PCT No.: PCT/JP2018/013431
§ 371 (c)(1),
(2) Date: Aug. 27, 2019

(87) PCT Pub. No.: WO2018/181804
PCT Pub. Date: Oct. 4, 2018

(65) Prior Publication Data
US 2020/0063596 A1    Feb. 27, 2020

(30) Foreign Application Priority Data
Mar. 30, 2017    (JP) .............................. JP2017-068401

(51) Int. Cl.
*F01D 17/10*    (2006.01)
*F01D 25/26*    (2006.01)
(Continued)

(52) U.S. Cl.
CPC ............. *F01D 17/10* (2013.01); *F01D 25/26* (2013.01); *F16M 1/04* (2013.01); *F01D 25/162* (2013.01);
(Continued)

(58) Field of Classification Search
CPC ........ F01D 17/00; F01D 25/28; F01D 25/162; F01D 11/22; F01D 25/24; F01D 25/243;
(Continued)

(56) References Cited

U.S. PATENT DOCUMENTS 3,849,857 A * 11/1974 Murray, Jr. ............... F16M 7/00
269/60
4,940,025 A *  7/1990 Ott ......................... F22B 37/248
122/510
(Continued)

FOREIGN PATENT DOCUMENTS

CN    103210184 A    7/2013
CN    105090686 A    11/2015
(Continued)

OTHER PUBLICATIONS

International Search Report dated Jun. 19, 2018, issued in counterpart application No. PCT/JP2018/013431, with English translation. (4 pages).

(Continued)

*Primary Examiner* — J. Todd Newton
*Assistant Examiner* — Jesse M Prager
(74) *Attorney, Agent, or Firm* — WHDA, LLP

(57)    ABSTRACT

A rotary machine includes: a rotary shaft supported by a bearing provided on a bearing base; and a casing housing the rotary shaft at least in part. The casing includes at least one support leg configured to support the casing on a base plate of a support structure member, and a support leg of the at least one support leg is supported on a support leg base provided on the base plate. The rotary machine further includes a height adjustment mechanism configured to adjust height of the casing, and the height adjustment mechanism includes an inclined surface of a support leg formed on the support leg, an inclined surface of a support (Continued)

leg base formed on the support leg base while facing the inclined surface of the support leg, and an actuator configured to move the support leg and the support leg base relative to each other.

6 Claims, 2 Drawing Sheets

(51) Int. Cl.
  *F16M 1/04* (2006.01)
  *F01D 25/16* (2006.01)
  *F01D 25/28* (2006.01)
(52) U.S. Cl.
  CPC .......... *F01D 25/28* (2013.01); *F05D 2220/31* (2013.01); *F05D 2260/30* (2013.01)
(58) Field of Classification Search
  CPC ........ F01D 25/26; F01D 25/265; F01D 25/00; F05D 2220/31; F05D 2260/30; F05D 2240/91; F16M 7/00; F16M 11/043; F16M 11/045; F16M 11/046; F16M 11/048; F16M 11/18; F16M 1/00; F16M 1/04
  See application file for complete search history.

(56) References Cited

U.S. PATENT DOCUMENTS 5,080,319 A * 1/1992 Nielsen .................... F16M 7/00
                                                    248/188.2

2002/0197147 A1  12/2002  Kawai et al.
2013/0149117 A1   6/2013  Hori et al.

FOREIGN PATENT DOCUMENTS

| CN | 205532738 U    | 8/2016  |         |
|----|----------------|---------|---------|
| DE | 3519386 A1 *   | 12/1986 | .............. G01M 7/08 |
| DE | 279289 A1      | 5/1990  |         |
| DE | 4227924 A1     | 2/1994  |         |
| DE | 102007006087 A1| 8/2008  |         |
| EP | 2692997 A1     | 2/2014  |         |
| EP | 2803443 A1     | 11/2014 |         |
| GB | 777598 A       | 6/1957  |         |
| JP | S50-058402 A   | 5/1975  |         |
| JP | H10-18806 A    | 1/1998  |         |
| JP | H11-48061 A    | 2/1999  |         |
| JP | 2002-364309 A  | 12/2002 |         |
| JP | 2007-009731 A  | 1/2007  |         |
| JP | 2010-180778 A  | 8/2010  |         |
| JP | 2010-270646 A  | 12/2010 |         |
| JP | 2012-159051 A  | 8/2012  |         |
| JP | 2015-175246 A  | 10/2015 |         |
| KR | 101504848 B1   | 3/2015  |         |
| WO | 2012/132085 A1 | 10/2012 |         |

OTHER PUBLICATIONS

Written Opinion dated Jun. 19, 2018, issued in counterpart application No. PCT/JP2018/013431, with English translation. (14 pages).
Office Action dated Feb. 5, 2021, issued in counterpart DE Application No. 112018001740.0, with English Translation. (15 pages).

* cited by examiner

ROTARY MACHINE

TECHNICAL FIELD

The present invention relates to a rotary machine, and more particularly to a rotary machine provided with a height adjustment mechanism of a casing of a steam turbine.

This application claims priority based on JP 2017-068401 filed in Japan on Mar. 30, 2017, of which the contents are incorporated herein.

BACKGROUND ART

A steam turbine is a rotary machine that converts steam energy into rotational motion of a rotary shaft provided with a turbine blade, and a predetermined clearance is provided between the turbine blade and an inner wall of a turbine casing that houses the turbine blade. Since steam leakage from this clearance results in poor performance of the steam turbine, a strict control of the clearance is required during operation of the turbine.

Since the steam turbine operates using high temperature steam, the steam turbine itself becomes hot during operation, and its components undergo thermal expansion. This displaces the rotary shaft upward from the position where the rotary shaft is located before when the turbine is in operation due to thermal expansion of a bearing and the like supporting the rotary shaft, and also displaces the casing upward from the position where the rotary shaft is located before when the turbine is in operation due to thermal expansion of a support leg (sometimes also referred to as "a cabriole leg" because of its shape) supporting the casing and a support leg base supporting the support leg as well as due to a tilt or the like occurring in the support leg. The temperature of the bearing and the temperature of the casing are not always the same. They are typically made of different materials, and the respective displacement amounts vary not only due to the difference in temperature and thermal expansion coefficient, but also due to difference in shape and size. Relative movement thus occurs between the rotary shaft and the casing, and a change occurs in the clearance.

Patent Document 1 describes a center support type turbine in which the surfaces of the lower and upper half casings including the support legs are covered with a heat insulating material.

In this turbine, the surfaces of the lower and upper half casings including the projecting portion are covered with a heat insulating material. This balances the temperatures of the upper half casing and the lower half casing and prevents distortion caused by the temperature difference between the upper half casing and the lower half casing.

Patent Document 2 describes a non-center support type steam turbine provided with support leg cooling means which forcibly cools the support legs when the turbine is stopped and makes the lower clearance between the rotating member and the stationary member wide.

In this steam turbine, the support leg is forcibly cooled by the support leg cooling means. This reduces the temperature difference between the upper half casing and the lower half casing and prevents the casing from distorting.

Patent Document 3 describes a steam turbine in which a position where the support leg is connected to the casing at the lower half of the casing is below the horizontal split plane of the casing and below the support surface of the support leg.

In this steam turbine, the relative displacement of the casing with respect to the rotary shaft is reduced by offsetting the upward thermal elongation of the casing starting at the connection position of the support leg, with the downward thermal elongation of the support leg itself starting at the support surface of the support leg.

CITATION LIST

Patent Literature

Patent Document 1: JP 2007-9731 A
Patent Document 2: JP H10-18806 A
Patent Document 3: JP 2012-159051 A

SUMMARY OF INVENTION

Technical Problem

However, the techniques of Patent Document 1 and Patent Document 2 do not solve the problem that a change in clearance occurs, since relative movement with respect to the rotary shaft occurs even in a case where the amount of displacement of the casing caused by thermal elongation is made uniform.

In the technique of Patent Document 3, it is conceivable that variations in temperature distribution result in a difference in the amount of thermal elongation between support legs, and this cannot prevent the change in the clearance.

The present invention has been made to solve the above-mentioned problem, and an object thereof is to provide a rotary machine capable of operating with a suitable clearance. In the rotary machine, the casing is moved relative to the rotary shaft, thereby preventing an inappropriate change in clearance that may occur during operation.

Solution to Problem

To solve the above-described problem, the present invention provides the following means.

Namely, a rotary machine according to a first aspect of the present invention includes a rotary shaft supported by a bearing provided on a bearing base, and a casing housing the rotary shaft at least in part. The casing includes at least one support leg configured to support the casing on a base plate of a support structure member, and a support leg of the at least one support leg is supported by a support leg base provided on the base plate. The rotary machine further includes a height adjustment mechanism configured to adjust height of the casing, and the height adjustment mechanism includes an inclined surface of a support leg formed on the support leg, an inclined surface of a support leg base formed on the support leg base while facing the inclined surface of the support leg, and an actuator configured to move the support leg and the support leg base relative to each other.

According to this configuration, the clearance between the leading end of the turbine blade and the inner wall of the casing can be adjusted and maintained appropriately during operation by moving the casing relative to the rotary shaft. In addition, since this configuration cannot cause the casing to displace theoretically beyond the height of the inclined surfaces of the support leg base and the support leg, the rotary machine can be designed to avoid an interference between the leading end of the turbine blade and the inner wall of the casing even in a case that an excessive operation of the actuator occurs.

A rotary machine according to a second aspect of the present invention is the rotary machine according to the first aspect of the present invention, wherein a rail configured to define a direction of movement of the support leg base is provided.

According to this configuration, a moving direction of the support leg base can be reliably determined, and a smooth movement of the support leg base can be realized.

A rotary machine according to a third aspect of the present invention is the rotary machine according to the first aspect or the second aspect of the present invention, wherein at least two of the support legs are provided in the casing of the rotary machine, and the at least two of the support legs are disposed with inclination directions of inclined surfaces of the at least two of the support legs being in line symmetry with respect to a symmetry axis.

A rotary machine according to a fourth aspect of the present invention is the rotary machine according to any one of the first to third aspects of the present invention, wherein the inclined surface of the support leg and the inclined surface of the support leg base each include a first inclined surface having a first inclination angle and a second inclined surface having a second inclination angle.

According to this configuration, it is possible to change the amount of rise or fall of the casing even in a case where the amount of movement of the support leg base is equal.

A rotary machine according to a fifth aspect of the present invention is the rotary machine according to the fourth aspect of the present invention, wherein the first inclined surface and the second inclined surface of one of the support leg and the support leg base are disposed while forming a V-shaped groove in combination, and the first inclined surface and the second inclined surface of the other of the support leg and the support leg base are disposed while forming a wedge shape complementary to the V-shaped groove.

According to this configuration, the casing can be raised or lowered regardless of the actuation direction of the actuator.

A rotary machine according to a sixth aspect of the present invention is the rotary machine according to any one of the first to fifth aspects of the present invention, wherein the height adjustment mechanism is provided on each of the at least one support leg.

According to this configuration, the displacement amount of each support leg can be set independently.

A rotary machine according to a seventh aspect of the present invention is the rotary machine according to any one of the third to fifth aspects of the present invention, wherein the at least one support leg includes two support legs, only one of the actuator is provided at the center between the two support legs disposed in line symmetry with respect to the symmetry axis.

According to this configuration, since the two support leg bases corresponding to the two support legs are driven by one actuator, it is easy to synchronize the movements of the support leg bases.

A rotary machine according to an eighth aspect of the present invention includes a base plate, a bearing base provided on the base plate, a rotary shaft supported by a bearing provided on the bearing base, a casing housing the rotary shaft at least in part, at least one support leg supporting the casing and having an inclined surface, a support leg base provided on the base plate, supporting a support leg of the at least one support leg, and having an inclined surface formed while facing the inclined surface of the support leg, and a height adjustment mechanism provided on the base plate and configured to adjust height of the casing. The height adjustment mechanism includes a drive mechanism configured to move the support leg and the support leg base relative to each other along a contact surface between an inclined surface of the support leg and an inclined surface of the support leg base.

According to this configuration, the clearance between the leading end of the turbine blade and the inner wall of the casing can be adjusted and maintained appropriately during operation by moving the casing relative to the rotary shaft. In addition, since this configuration cannot displace the casing theoretically beyond the height of the inclined surfaces of the support leg base and the support leg, the rotary machine can be designed to avoid an interference between the leading end of the turbine blade and the inner wall of the casing even in a case that an excessive operation of the driving mechanism occurs.

Advantageous Effect of Invention

According to the rotary machine of the present invention, it is possible to adjust the height of the casing with respect to the rotary shaft, and the clearance during operation can be suitably maintained.

DESCRIPTION OF EMBODIMENTS

The first embodiment of the present invention will be described below with reference to FIGS. 1 and 2.

Figure 1:
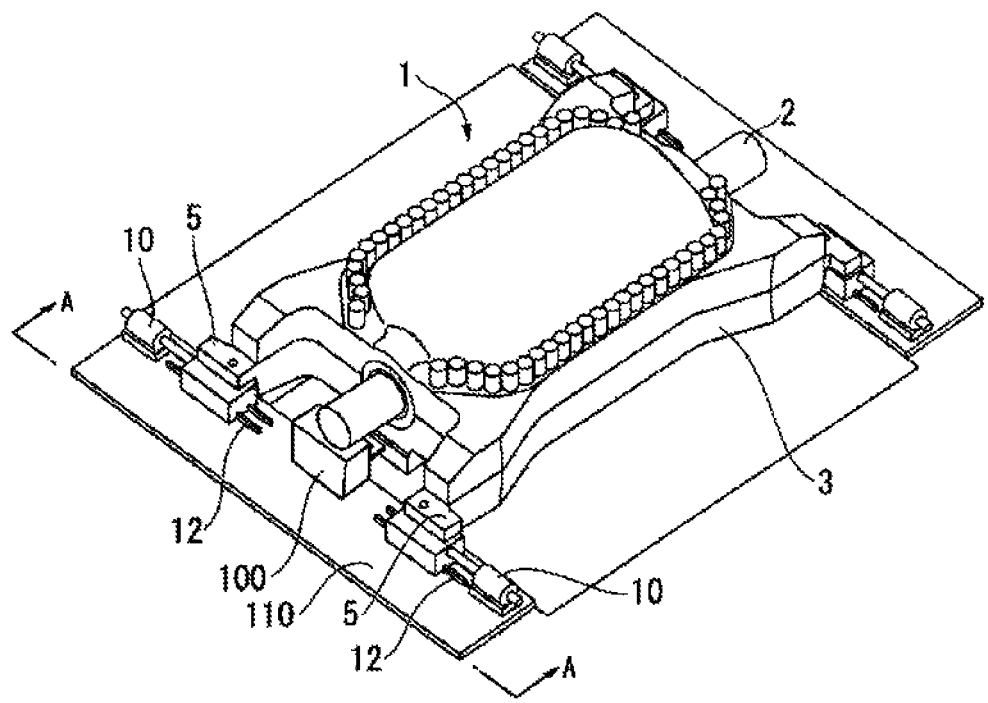
FIG. 1 is a perspective view schematically illustrating the entirety of a rotary machine according to the present invention.

As illustrated in FIG. 1, a rotary machine 1 according to the first embodiment of the present invention includes a rotary shaft 2 and a casing 3 housing the rotary shaft 2 at least in part. The rotary machine 1 is preferably a steam turbine, and a turbine blade (not illustrated) is provided on the outer periphery of the rotary shaft 2. The turbine blade is housed in the casing 3, and a predetermined clearance is set between the leading end of the turbine blade and the inner wall of the casing 3. The rotary shaft 2 is supported by a bearing (not illustrated) installed on a bearing base 100, and the bearing base 100 is provided on a base plate 110 of a support structure member.

The casing 3 is provided with support legs 5 configured to support the casing 3. The supporting leg 5 is sometimes also referred to as "a cabriole leg" because of its shape. The support leg 5 is supported by a support leg base 8 provided on the base plate 110. In the present embodiment, the support legs 5 are provided on the end walls of the four corners of the casing 3, but the number of support legs and the positions at which the support legs are provided are not limited to the four corners of the casing 3. Further, as illustrated in FIG. 2, the contact surface of the support leg 5 with the support leg base 8 forms an inclined surface 6, and the surface of the support leg base 8 in contact with the inclined surface 6 of the support leg 5 forms the inclined surface 9 corresponding to the inclined surface 6 of the support leg 5. Namely, the surface of the support leg base 8 in contact with the inclined surface 6 of the support leg 5 forms an inclined surface 9 formed to face the inclined surface 6 of the support leg 5.

In the contact surface between the support leg 5 and the support leg base 8, the support leg 5 is configured to be movable on the support leg base 8 smoothly, along the contact surface between the support leg 5 and the support leg base 8. The friction on the contact surface between the support leg 5 and the support leg base 8 is reduced by, for example, imparting lubricity to the contact surface between the support leg 5 and the support leg base 8 with a lubricant such as grease or lubricating oil, disposing a plurality of rollers or a plurality of bearing balls to one of the support leg 5 and the support leg base 8, applying low friction surface treatment on the support leg 5 and the support leg base 8, and using magnetic members repelling each other on the contact surfaces of the support legs 5 and the support leg base 8. This enables the support leg 5 to move smoothly with respect to the support leg base 8.

When using a lubricant such as grease, a groove is provided in at least one of the support leg 5 and the support leg base 8 and filled with the lubricant. This groove thus serves a pipe-like role at the contact surface between the support leg 5 and the support leg base 8, enabling the lubricant to be spread over the entire contact surface through the groove and the support leg 5 to move smoothly with respect to the support leg base 8.

The base plate 110 is generally configured to be movable along the longitudinal direction of the rotary shaft 2 and is further provided with a hydraulic cylinder serving as an actuator 10 (drive mechanism) and a guide rail 12. One end of the actuator 10 is coupled to the support leg base 8, and the guide rail 12 is disposed so as to guide the movement of the support leg base 8. Thus, the support leg base 8 is configured movable relative to the support leg 5. In addition to the actuator 10 and the guide rail 12, the inclined surface 6 of the support leg and the inclined surface 9 of the support leg base described above integrally constitute a height adjustment mechanism 15 of the casing 3. Namely, the height adjustment mechanism 15 includes a drive mechanism configured to move the support leg 5 and the support leg base 8 relative to each other along the contact surface between the inclined surface 6 of the support leg 5 and the inclined surface 9 of the support leg base 8.

In the present embodiment, a hydraulic cylinder is used as the actuator 10. However, it is also possible to use another drive mechanism, such as a combination of a ball screw and a servomotor. Further, in the present embodiment, the support leg base 8 is formed so as to move in the direction orthogonal to the rotary shaft 2, but may be formed so as to move in the direction parallel to the rotary shaft 2. Furthermore, the actuator 10 of the height adjustment mechanism 15 is provided to each of the support leg bases 8 in the present embodiment, but, for example, two support leg bases 8 disposed at line symmetrical positions with respect to the rotary shaft 2 may be driven by a single actuator 10 disposed on the symmetry axis.

Figure 2:
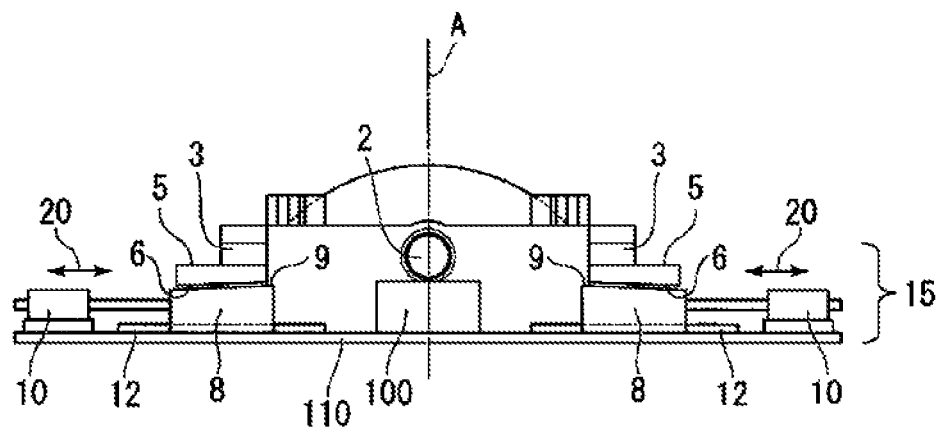
FIG. 2 is a view illustrating a rotary machine according to a first embodiment of the present invention, as viewed from a sight line A-A in FIG. 1.

As illustrated in FIG. 2, in the present embodiment, the inclined surfaces 6 of the two support legs 5 disposed in line symmetry with respect to the symmetry axis A orthogonal to the rotary shaft 2 are each inclined to be lowered in the direction away from the symmetry axis A, but it is also possible to make them inclined to be raised in the direction away from the symmetry axis A. Further, in the present embodiment, the two support legs 5 are disposed in line symmetry with respect to the symmetry axis A orthogonal to the rotary axis A such that the inclination directions of the inclined surfaces 6 thereof are in line symmetry with respect to the above-mentioned symmetry axis A, but it is also possible to dispose the two inclined surfaces 6 in the same direction. More specifically, the symmetry axis A is orthogonal to the rotary shaft 2 and the base plate 110.

Furthermore, in the present embodiment, the support leg base 8 is moved and guided using the guide rail 12, but a guide groove may be formed in the base plate 110, and the support leg base 9 may be fitted in the groove so that the support leg base 9 is moved and guided using the guide groove. This can eliminate the need for the guide rail 12.

Further, in the present embodiment, the support leg base 8 is provided on the base plate 110, and the support leg 5 is supported on the support leg base 8. However, in addition to them, although not illustrated, a flat base plate fixed to the outside (ground, base, or the like) with an anchor or the like may be provided below the base plate 110, and the base plate 110 may be configured to be smoothly movable with respect to the base plate by providing a groove in the bottom surface of the base plate 110, and filling the groove with a lubricant such as grease for the lubrication between the base plate and the base plate 110. In a case that the base plate 110 is placed on the upper surface of the flat base plate, the groove provided in the bottom surface of the base plate 110 plays a pipe-like role, enabling the lubricant to be spread over the entire contact surface through this groove. A configuration in which the base plate 110 can smoothly move with respect to the base plate in this manner enables the load on the drive mechanism such as the actuator 10 due to the thermal elongation of the rotary machine to be reduced.

Further, in the present embodiment, the rotary machine may be configured such that a groove is provided in at least one of the support leg base 8 and the base plate 110 and filled with a lubricant such as grease for lubrication between the support leg base 8 and the base plate 110 so that the support leg base 8 can move smoothly with respect to the base plate 110. The groove plays a pipe-like role on the contact surface between the support leg base 8 and the base plate 110 and enables the lubricant to be spread over the entire contact surface, and the support leg base 8 can move smoothly with respect to the base plate 110. The load applied to the contact surface between the support leg base 8 and the base plate 110 due to the thermal elongation of the rotary machine can thus be reduced.

Note that although the base plate 110 is generally also configured to absorb the thermal elongation in the direction along the longitudinal direction of the rotary shaft 2 of the casing 3, this is different from the gist of the present invention and thus no detailed description of the configuration is given in the document.

Next, the operation of the rotary machine 1 including the height adjustment mechanism 15 having the above-described configuration will be described with reference to the drawings.

Since the material of the bearing base and the material of the casing 3 are generally different, the respective thermal expansion coefficients are different. Therefore, in a case that the temperature of the bearing base and the casing 3 increases with the operation of the rotary machine, the rotary shaft 2 exhibits a displacement amount different from that of the casing 3 due to the difference in thermal expansion coefficient, shape, and size. In addition, since the bearing base and the casing 3 do not always have the same temperature, the difference may cause the difference in the amount of displacement. As a result, relative movement between the rotary shaft 2 and the casing 3 occurs, and the clearance between the leading end of the turbine blade and the inner wall of the casing 3 changes.

To maintain this clearance properly, it is necessary to move the casing vertically relative to the rotary shaft. Specifically, in FIG. 2, the actuator 10 is driven to move the support leg base 8 in the direction of the arrow 20. Since the support leg base 8 supports the support leg 5 with the inclined surface 9 and the inclined surface 6 therebetween, in a case that the support leg base 8 is moved, the interaction between the inclined surface 9 and the inclined surface 6 causes the support leg 5 to be raised or lowered. Thus, the casing 3 can be raised or lowered with respect to the rotary shaft 2.

The amount of displacement to be given to the casing 3 can be determined on the basis of data on the clearance when not in operation and on the clearance during operation collected in advance. As another method, the height can be adjusted in real time on the basis of an estimated amount of change in the clearance obtained through an analysis in advance, or on the basis of the estimated amount of clearance based on measured temperature of the bearing base, the support leg 5, and the like or a directly and continuously measured clearance using a noncontact sensor such as an eddy current sensor.

According to the first embodiment of the present invention, the casing 3 can be moved relative to the rotary shaft 2 using the height adjustment mechanism, thereby enabling the clearance between the leading end of the turbine blade and the inner wall of the casing 3 to be adjusted. In addition, since this height adjustment mechanism does not theoretically displace the casing 3 beyond the height of the inclined surface 6 and the inclined surface 9, the possibility of interference between the leading end of the turbine blade and the inner wall of the casing 3 occurring when the actuator malfunctions is low compared with the case in which the casing 3 is directly lifted by the actuator.

Figure 3:
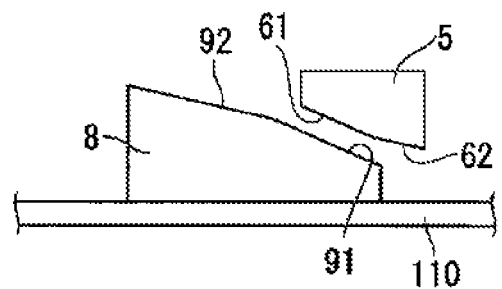
FIG. 3 is a side view illustrating a support leg and a support leg base according to a second embodiment of the present invention.

FIG. 3 illustrates a support leg 5 and a support leg base 8 according to a second embodiment of the present invention. The configuration of the second embodiment is the same as that of the first embodiment except for the shape of the inclined surfaces of the support leg and the support leg base.

In the second embodiment, the inclined surface 6 of the support leg includes a first inclined surface 61 having a first inclination angle and a second inclined surface 62 having a second inclination angle. Similarly, the inclined surface 9 of the support leg base includes a first inclined surface 91 having a first inclination angle and a second inclined surface 92 having a second inclination angle.

The method of movement of the support leg base 8 in the second embodiment is the same as the method of movement in the first embodiment. Therefore, in a case that the first inclined surface 61 and the first inclined surface 91 are in contact, the casing 3 can be raised or lowered at a high speed. Conversely, in a case that the second inclined surface 62 and the second inclined surface 92 are in contact, the casing 3 can be raised or lowered at a slow speed. Namely, providing the inclined surface having two kinds of inclination angles allows the rise amount or fall amount of the casing 3 to change with respect to the fixed amount of movement of the support leg base 8.

As an effect of the configuration of the present embodiment, the casing can be raised at a fast speed half way through the target value and at a slow speed nearer to the target value in a case that the rise amount of the casing necessary during operation is a known fixed amount, by appropriately adjusting the inclination angle of each inclined surface. This thereby enables the clearance between the leading end of the turbine blade and the inner wall of the casing 3 to be more finely adjusted.

Figure 4:
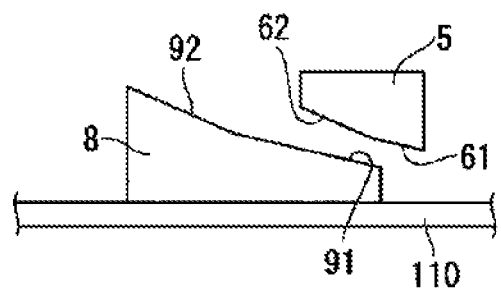
FIG. 4 is a side view illustrating a support leg and a support leg base according to a modification of the second embodiment of the present invention.

In this embodiment, the inclination angle of the first inclined surface is steeper than the inclination angle of the second inclined surface; however the inclination angle of the first inclined surface can be formed so as to be gentler than the inclination angle of the second inclined surface (see FIG. 4). In this case, the raising or lowering speed of the casing is slow in a case that the first inclined surface 61 and the first inclined surface 91 are in contact, and fast in a case that the second inclined surface 62 and the second inclined surface 92 are in contact. For the inclined surfaces, the same effect as that of the inclined surface illustrated in FIG. 3 can be expected in a case that the casing needs to be lowered during operation.

Figure 5:
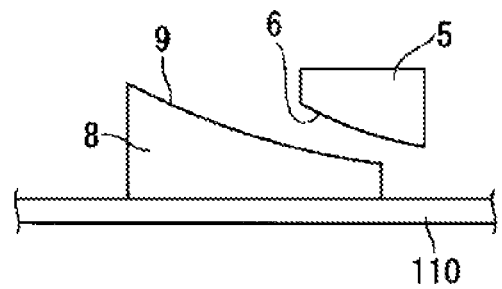
FIG. 5 is a side view illustrating a support leg and a support leg base according to a third embodiment of the present invention.

FIG. 5 illustrates a support leg 5 and a support leg base 8 according to a third embodiment of the present invention. The configuration of the third embodiment is the same as that of the first embodiment except for the shape of the inclined surfaces of the support leg and the support leg base.

In the third embodiment, the inclined surface 6 of the support leg and the inclined surface 9 of the support leg base are formed with curved surfaces. With this configuration, the rising or lowering speed of the casing 3 can be changed continuously but not in a stepwise manner.

Figure 6:
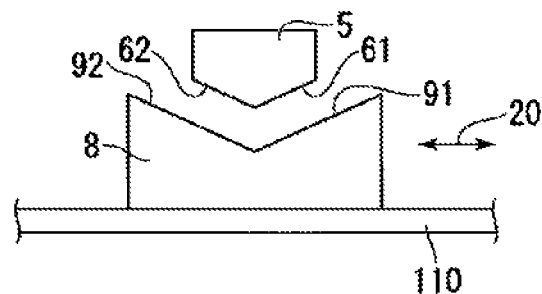
FIG. 6 is a side view illustrating a support leg and a support leg base according to a fourth embodiment of the present invention.

FIG. 6 illustrates a support leg 5 and a support leg base 8 according to a fourth embodiment of the present invention. The configuration of the fourth embodiment is the same as that of the first embodiment except for the shape of the inclined surfaces of the support leg and the support leg base.

In the fourth embodiment, the first inclined surface 91 and the second inclined surface 92 of the support leg base 8 are each disposed to form a side wall of the V-shaped groove. On the other hand, the first inclined surface 61 and the second inclined surface 62 of the support leg 5 are wedge-shaped to be fitted into the V-shaped groove of the support leg base 8.

In the fourth embodiment, the actuator 12 moves the support base 8 in the direction of the arrow 20 so as to press the first inclined surface 91 against the first inclined surface 61 or so as to press the second inclined surface 92 against the second inclined surface 62. This movement of the support leg base 8 raises or lowers the casing 3.

The advantage of this fourth embodiment is that, in a case where there is a difference according to the characteristics of the actuator 12 or the like between the push speed and the pull speed, a suitable moving speed of the casing 3 can be selected by selecting the moving direction of the support leg base 8. Further, the inclination angles of the first inclined surface and the second inclined surface are different from each other, and this makes it possible to make the movement speed of the casing 3 have variations.

A further advantage of the height adjustment mechanism according to the present invention is that the fine adjustment of the installation height of the rotary machine can be easily performed at the time of installation of the rotary machine. The use of this mechanism allows the installation height of the rotary machine to be finely adjusted without using a liner or the like, and as a result, the initial clearance can be easily set.

The embodiments of the present invention have been described above in detail with reference to the drawings, but the specific configurations are not limited to those embodiments, and design changes and the like that do not depart from the scope of the present invention are also included.

INDUSTRIAL APPLICABILITY

According to the rotary machine according to the present invention, the height of the casing can be adjusted with respect to the rotary shaft, and the clearance during operation can be suitably maintained.

REFERENCE SIGNS LIST

1 Rotary machine
2 Rotary shaft
3 Casing
5 Support leg
6 Inclined surface of support leg
8 Support leg base
9 Inclined surface of support leg base
10 Actuator
12 Guide rail
15 Height adjustment mechanism
61 First inclined surface
62 Second inclined surface
91 First inclined surface
92 Second inclined surface
100 Bearing base
110 Base plate
A Symmetry axis

The invention claimed is:

1. A rotary machine comprising:
a rotary shaft supported by a bearing provided on a bearing base; and
a casing housing the rotary shaft at least in part,
wherein, the casing includes at least one support leg configured to support the casing, and a support leg of the at least one support leg is supported by a support leg base,
the rotary machine further includes a height adjustment mechanism configured to adjust height of the casing, and
the height adjustment mechanism includes
an inclined surface of the support leg formed on the support leg;
an inclined surface of the support leg base formed on the support leg base while facing the inclined surface of a support leg; and
an actuator configured to move the support leg and the support leg base relative to each other,
wherein the inclined surface of the support leg and the inclined surface of the support leg base each include a first inclined surface having a first inclination angle and a second inclined surface having a second inclination angle,
wherein the first inclined surface and the second inclined surface of one of the support leg and the support leg base are disposed while forming a V-shaped groove in combination,
the first inclined surface and the second inclined surface of the other of the support leg and the support leg base are disposed while forming a wedge shape complementary to the V-shaped groove,
wherein the first inclined surface and the second inclined surface of the support leg are continuously provided on the same inclined surface of the support leg, and
wherein the first inclined surface and the second inclined surface of the support leg base are continuously provided on the same inclined surface of the support leg base.

2. The rotary machine according to claim 1,
wherein a rail configured to define a direction of movement of the support leg base is provided.

3. The rotary machine according to claim 1 or 2,
wherein at least two of the support leg are provided in the casing, and
the at least two of the support legs are disposed with inclination directions of the inclined surfaces of the at least two of support legs being in line symmetry with respect to a symmetry axis.

4. The rotary machine as in any of claims 1-2, wherein the inclined surface of the support leg and the inclined surface of a support leg base are provided to each of the at least one support leg, and wherein the height adjustment mechanism is provided on each of the at least one support leg each of which provided with the inclined surface of the support leg and the inclined surface of a support leg base.

5. A rotary machine comprising:
a base plate;
a bearing base provided on the base plate;
a rotary shaft supported by a bearing provided on the bearing base;
a casing housing the rotary shaft at least in part;
at least one support leg supporting the casing and including an inclined surface;
a support leg base provided on the base plate, supporting a support leg of the at least one support leg, and including an inclined surface formed while facing the inclined surface of the support leg; and
a height adjustment mechanism provided on the base plate and configured to adjust height of the casing,
wherein the height adjustment mechanism includes a drive mechanism configured to move the support leg and the support leg base relative to each other along a contact surface between the inclined surface of a support leg and the inclined surface of a support leg base,
wherein an inclined surface of the support leg and an inclined surface of the support leg base each include a first inclined surface having a first inclination angle and a second inclined surface having a second inclination angle,
wherein the first inclined surface and the second inclined surface of one of the support leg and the support leg base are disposed while forming a V-shaped groove in combination,
the first inclined surface and the second inclined surface of the other of the support leg and the support leg base are disposed while forming a wedge shape complementary to the V-shaped groove,
wherein the first inclined surface and the second inclined surface of the support leg are continuously provided on the same inclined surface of the support leg, and
wherein the first inclined surface and the second inclined surface of the support leg base are continuously provided on the same inclined surface of the support leg base.

6. The rotary machine according to claim 3, wherein the inclined surface of the support leg and the inclined surface of a support leg base are provided to each of the at least one support leg, and wherein the height adjustment mechanism is provided on each of the at least one support leg each of which provided with the inclined surface of the support leg and the inclined surface of a support leg base.

\* \* \* \* \*